United States Patent [19]

Hahn

[11] Patent Number: 4,522,572
[45] Date of Patent: Jun. 11, 1985

[54] STRIKE INDICATOR AND HOOK SETTER, COMBINED

[76] Inventor: Paul L. Hahn, 150 Iris St., Broomfield, Colo. 80020

[21] Appl. No.: 417,631

[22] Filed: Oct. 18, 1982

[51] Int. Cl.³ .............................................. A01K 91/06
[52] U.S. Cl. .......................................... 43/16; 43/15; 43/17
[58] Field of Search ............................... 43/15, 16, 17

[56] References Cited

U.S. PATENT DOCUMENTS

| | | | |
|---|---|---|---|
| 77,893 | 5/1868 | Koehler | 43/15 |
| 783,169 | 2/1905 | Ball | 43/16 |
| 1,045,177 | 11/1912 | Pluschke | 43/15 |
| 2,549,295 | 3/1951 | Derby | 43/16 |
| 2,693,045 | 11/1954 | John | 43/16 |
| 2,733,532 | 2/1956 | Siegel | 43/17 |
| 2,921,398 | 1/1960 | Cunningham | 43/15 |
| 3,057,105 | 10/1962 | Moses | 43/16 |
| 3,686,785 | 8/1972 | Dixon | 43/15 |

FOREIGN PATENT DOCUMENTS 804741 10/1936 France ................................. 43/17

Primary Examiner—Nicholas P. Godici
Assistant Examiner—Thomas S. Mieczkowski

[57] ABSTRACT

A combined strike indicator and hook setter adaptable to a fishing line and independent from a fishing pole having of a base, a removable spring arm with a releasable line holding means attached at one end, and a sear mechanism for actuating the removable spring arm from a set to a releasable position.

1 Claim, 5 Drawing Figures

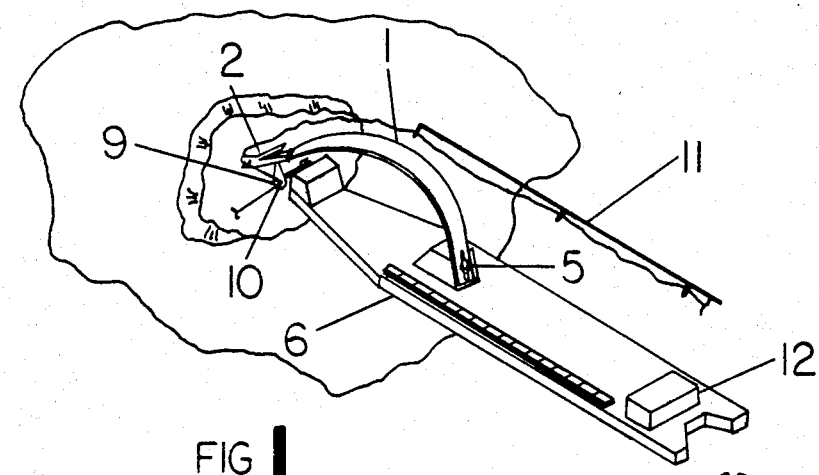
FIG 1
FIG 2
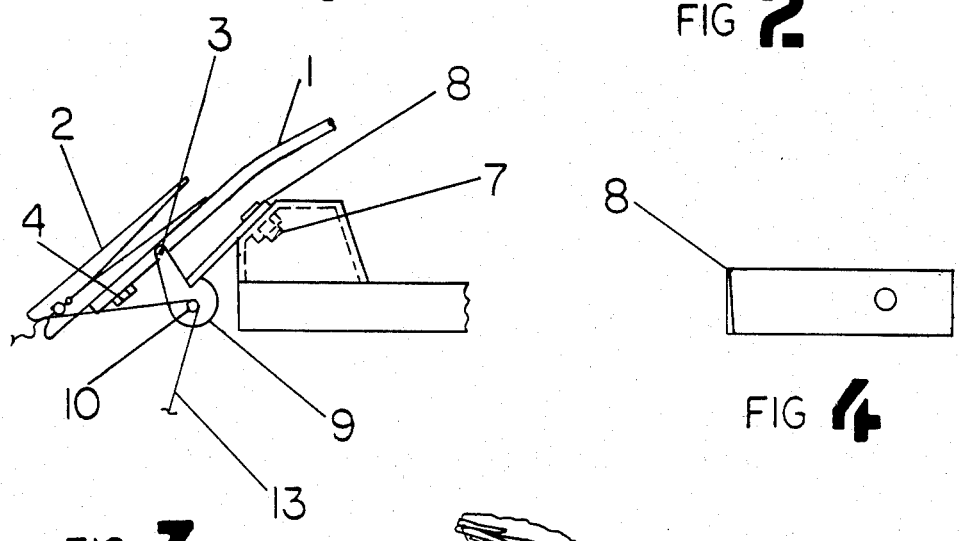
FIG 3
FIG 4
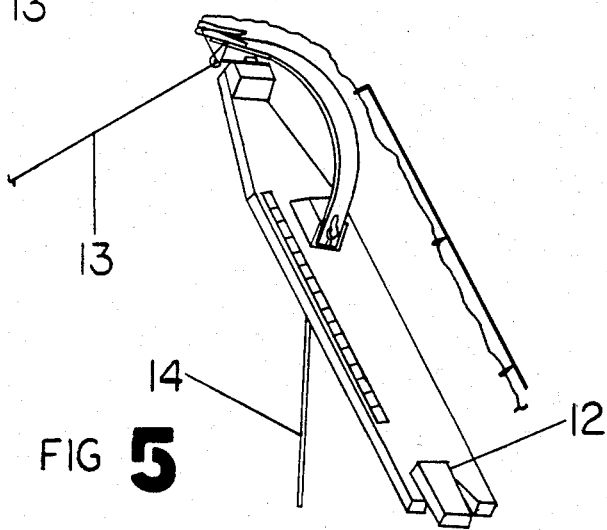
FIG 5

STRIKE INDICATOR AND HOOK SETTER, COMBINED

SUMMARY OF THE INVENTION

Prior art devices for holding a fishing pole and for setting the hook when the fish takes the bait are not easily adapted or efficient for ice fishing since they must be anchored into the ice. It is a principal object of the present invention to provide an improved fishing device ideally arranged for ice fishing but adaptable for open water fishing. The device sets the hook. Then the fisherman grabs the pole and releases the line from the device to bring in the catch. It is apparent that a brick or a heavy stone may be needed to securely hold the device on the ice.

It is a further object of the invention to provide a hook setting force that can easily be set from light to heavy by adjustment of the sear and sear bar mechanism.

It is still another object of the invention to provide in a fishing device the ability to instantly hook a fish upon the release of a sear from a sear bar. This is accomplished by resting the fishing line over a roll pin attached to the sear. The pull of the line which in turn pivots the sear away from the sear bar activates the arm to set the hook.

Other objects and features of the invention will be apparent upon a perusal of the following specification and drawings in which:

FIG. 1 is a side elevation view of a fishing device constructed according to the invention and is in its cocked position with parts in section.

FIG. 2 is a top plan view of the structure shown in FIG. 1 and showing an 18 inch scale to measure fish.

FIG. 3 is a side view of sear-B. B is a bottom view of the arm, showing clothes pin #2 and sear #9 attach to the end of plastic arm.

FIG. 4 is a top view of the sear bar and the sear in the middle position.

FIG. 5 is a side view in position for bank fishing with supporting rod #14.

The present embodiment is a preferred embodiment, but it is to be understood that changes can be made in the present embodiment by one skilled in the art without departing from the spirit and scope of the present invention.

DESCRIPTION OF THE PREFERRED EMBODIMENT

Referring to the drawing it may be seen that the invention comprises a base 6 and a tapered spring arm of resilient plastic 1. The large end of the plastic spring arm 1 is secured to the base with a wing screw 5. Sear 9 is affixed to the small end of the spring arm 1 by a slot in the arm and pin 3. This allows movement to engage sear 9 with sear bar 8. This sear 9 contains the roll pin 10 that line 13 rests over. Spring holder 2 is attached to the small end of the arm by screw 4. Sear bar 8 is secured by screw and nut 7 on the base 6. Sear bar 8 is angled to permit sear release to respond to a light or a heavy pull of the line.

In operation the line from the pole is clamped in a line holding means such as a clothes pin 2. The line is then routed around roll pin 10 to the water. When a fist strikes, sear 9 is pivoted around pin 3 and released from sear bar 8 allowing the spring arm to move from a set to a released position.

What I claim is:

1. A combined strike indicator and hook setter adaptable to a fishing line and independent from a fishing pole comprising, a base, a removable spring arm attached to said base movable between a set and a released position, a releasable line holding means attached to a free end of said removable spring arm, a sear pivotably attached to said free end of said removable spring arm, a sear bar mounted on one end of said base, and a roll pin attached to an opposite end of said sear for holding said fishing line, said fishing line running from said fishing pole through said releasable line holding means around said roll pin and into the water such that a strike by a fish will pivot said sear away from said sear bar releasing said spring from said set position to said release position thereby setting the hook and simultaneously signalling the fisherman of the strike.

* * * * *